(12) United States Patent
Makadia et al.

(10) Patent No.: US 9,298,682 B2
(45) Date of Patent: Mar. 29, 2016

(54) ANNOTATING IMAGES

(71) Applicant: Google Inc., Mountain View, CA (US)

(72) Inventors: Ameesh Makadia, New York, NY (US);
Sanjiv Kumar, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 458 days.

(21) Appl. No.: 13/799,307

(22) Filed: Mar. 13, 2013

(65) Prior Publication Data

US 2013/0198601 A1  Aug. 1, 2013

Related U.S. Application Data

(63) Continuation of application No. 12/425,910, filed on Apr. 17, 2009, now Pat. No. 8,422,832.

(60) Provisional application No. 61/059,702, filed on Jun. 6, 2008.

(51) Int. Cl.
```
G06K 9/54      (2006.01)
G06F 17/24     (2006.01)
G06F 17/30     (2006.01)
G06K 9/00      (2006.01)
G06K 9/46      (2006.01)
```
(52) U.S. Cl.
CPC ........ *G06F 17/241* (2013.01); *G06F 17/30265* (2013.01); *G06K 9/00664* (2013.01); *G06K 9/46* (2013.01)

(58) Field of Classification Search
None
See application file for complete search history.

(56) References Cited

U.S. PATENT DOCUMENTS

| | | |
|---|---|---|
| 2002/0188602 A1 | 12/2002 | Stubler et al. |
| 2007/0271226 A1 | 11/2007 | Zhang et al. |
| 2007/0296993 A1 | 12/2007 | Bai |
| 2008/0021928 A1 | 1/2008 | Yagnik |

FOREIGN PATENT DOCUMENTS

| | | |
|---|---|---|
| EP | 1 696 353 | 8/2006 |
| JP | 2007-207031 | 8/2007 |

(Continued)

OTHER PUBLICATIONS

Ding et al, Affine-Invariant Image Retrieval Based on Wavelet Interest Points, IEEE 2005.*

(Continued)

*Primary Examiner* — Mark Roz
(74) *Attorney, Agent, or Firm* — Fish & Richardson P.C.

(57) ABSTRACT

Methods, systems, and apparatus, including computer program products, for generating data for annotating images automatically. In one aspect, a method includes receiving an input image, identifying one or more nearest neighbor images of the input image from among a collection of images, in which each of the one or more nearest neighbor images is associated with a respective one or more image labels, assigning a plurality of image labels to the input image, in which the plurality of image labels are selected from the image labels associated with the one or more nearest neighbor images, and storing in a data repository the input image having the assigned plurality of image labels. In another aspect, a method includes assigning a single image label to the input image, in which the single image label is selected from labels associated with multiple ranked nearest neighbor images.

5 Claims, 13 Drawing Sheets

(56) References Cited

FOREIGN PATENT DOCUMENTS

| KR | 10-2007-0115194 | 12/2007 |
| WO | WO 2007-136861 | 11/2007 |

OTHER PUBLICATIONS

Dorado et al, Semi-Automatic Image Annotation Using Frequent Keyword Mining, IEEE 2003.*

EP Communication from EP Application No. 09767173.9 dated Oct. 22, 2012, 6 pages.

Korean Intellectual Property Office Notice of Office Action (w/English translation) for KR 10-2011-7000140 dated Sep. 2, 2013, 6 pages.

Barnard, K. and Johnson, M., "Word Sense Disambiguation with Pictures," *Artificial Intelligence* 167:13-30 (2005).

Blei, D., et al., "Modeling Annotated Data," In: *Proc. ACM SIGIR* 127-134 (2003).

Blei, D., et al., "Latent Dirichlet Allocation," *Journal of Machine Learning Research* 3:993-1022 (2003).

Carneiro, G. and Vasconcelos, N., "A Database Centric View of Semantic Image Annotation and Retrieval," In: *SIGIR* 559-566 (2005a).

Carneiro, G. and Vasconcelos, N., "Formulating Semantic Image Annotation as a Supervised Learning Problem." In: *IEEE CVPR*, 559-566 (2005b).

Carneiro, G., et al., "Supervised Learning of Semantic Classes for Image Annotation and Retrieval," *IEEE Transactions on Pattern Analysis and Machine Intelligence* 29(3):394-410 (2007).

Datta, R., et al., "Image Retrieval: Ideas, Influences, and Trends of the New Age," *ACM Computing Surveys* 40(2):1-60 (2008).

Duygulu, P., et al., "Object Recognition as Machine Translation: Learning a Lexicon for a Fixed Image Vocabulary," In: *Proceedings of the 7th European Conference on Computer Vision* 2353:97-112 (2002).

Feng, S. L., et al., "Multiple Bernoulli Relevance Models for Image and Video Annotation," In: *IEEE Conf. Computer Vision and Pattern Recognition* (2004).

Frome, A., et al., "Learning Globally-Consistent Local Distance Functions for Shape-Based Image Retrieval and Classification," In: *Proceedings of the IEEE International Conference on Computer Vision, Rio de Janeiro, Brazil* (2007).

Gao, Y. and Fan, J., "Incorporating Concept Ontology to Enable Probabilistic Concept Reasoning for Multi-Level Image Annotation," In: *Proceedings of the 8th ACM international workshop on Multimedia information retrieval*, 79-88 (2006).

Hare, J. S., et al., "Mind the Gap: Another Look at the Problem of the Semantic Gap in Image Retrieval," *Multimedia Content, Analysis, Management and Retrieval*, 6073:607309-1-607309-12 (2006).

Howarth, P. and Rüger, S., "Fractional Distance Measures for Content-Based Image Retrieval," *Lecture Notes in Computer Science: Advances in Information Retrieval* 3408:447-456 (2005).

Howarth, P. and Ruger, S., "Robust Texture Features for Still-Image Retrieval," *Vision, Image and Signal Processing, IEE Proceedings* 152:6 868-874 (2005).

Jeon, J., et al., "Automatic Image Annotation and Retrieval using Cross-Media Relevance Models," In: Proc. ACM SIGIR Conf. Research and Development in Information Retrieval, New York, NY, USA, 119-126 (2003).

Jin, R., et al., "Effective Automatic Image Annotation via a Coherent Language Model and Active Learning," In: *Proc. ACM Multimedia Conference*, 892-899 (2004).

Edited by Thrun, S., et al., *Advances in Neural Information Processing Systems 16: Proceedings of the 2003 Conference*. Cambridge, MA: The MIT Press: A Bradford Book (2004).

Lavrenko, V., et al., "A Model for Learning the Semantics of Pictures," In: *Advances in Neural Information Processing Systems 16*, 553-560 (2004).

Li, J. and Wang, J. Z., "Automatic Linguistic Indexing of Pictures by a Statistical Modeling Approach," *IEEE Transactions on Pattern Analysis and Machine Intelligence* 25:9 1075-1088 (2003).

Li, J. and Wang, J. Z., "Real-Time Computerized Annotation of Pictures," *Proc. ACM Multimedia* 911-920 (2006).

Metzler, D. and Manmatha, R., "An Inference Network Approach to Image Retrieval," *Image and Video Retrieval* 3115:42-50 (2004).

Monay, F., and Gatica-Perez, D., "On Image Auto-Annotation with Latent Space Models," In: *Proc. ACM Int '1 Conf. Multimedia*, 275-278 (2003).

Mori, Y., et al., "Image-to-Word Transformation Based on Dividing and Vector Quantizing Images with Words," In: *Proceedings of the First International Workshop on Multimedia Intelligent Storage and Retrieval Management (MISRM)*, (1999).

Tibshirani, R., "Regression Shrinkage and Selection via the Lasso," *J. Royal Statistical Soc. B* 58(1): 267-288 (1996).

Varma, M. and Ray, D., "Learning the Discriminative Power-Invariance Trade-Off," In: *Proceedings of the IEEE International Conference on Computer Vision, Rio de Janeiro, Brazil* (2007).

von Ahn, L. and Dabbish, L., "Labeling Images with a Computer Game," In: *Proceedings of the ACM CHI* 6(1):319-326 (2004).

Wang, L., et al., "Automatic Image Annotation and Retrieval Using Subspace Clustering Algorithm," In: *ACM Int'l Workshop Multimedia Dadabases* 100-108 (2004).

Yang, C., et al., "Region-Based Image Annotation Using Asymmetrical Support Vector Machine-Based Multiple-Instance Learning," In: *Proceedings of the IEEE International Conference on Computer Vision and Pattern Recognition* (2006).

Yavlinsky, A., et al., "Automated Image Annotation Using Global Features and Robust Nonparametric Density Estimation," In: *International Conference on Image and Video Retrieval (CIVR)* 3568:507-517 (2005).

Yushi Jing et al., "PageRank for Product Image Search", WWW 2008 / Refereed Track: Rich Media, Apr. 21-25, 2008, Beijing, China, pp. 307-315.

Ameesh Makadia et al., "A New Baseline for Image Annotation", 2008, 14 pages.

Hilal Zitouni et al., "Re-ranking Image Results using a Graph Algorithm", Apr. 20-22, 2008, 4 pages.

English-language translation of Chinese Office Action issued Nov. 28, 2011 in corresponding Chinese Application No. 200980129633.X.

ISR for PCT/US2009/040975 dated Feb. 5, 2010.

European Search Report for EP 09767173.9 dated Oct. 9, 2012.

* cited by examiner

| | | | | | |
|---|---|---|---|---|---|
| |  |  |  |  |  |
| Predicted keywords | sky, jet, plane, smoke, formation | grass, rocks, sand, valley, canyon | sun, water, sea, waves, birds | water, tree, grass, deer, white-tailed | bear, snow, wood, deer, white-tailed |
| Human annotation | sky, jet, plane, smoke | rocks, sand, valley, canyon | sun, water, clouds, birds | tree, forest, deer, white-tailed | tree, snow, wood, fox |

| | | | | | |
|---|---|---|---|---|---|
| |  |  |  |  |  |
| Predicted keywords | bikini, girl, grass, hair, woman | bear, black, brown, nose, white | band, light, man, music, play | man, old, picture, red, wall | cloud, grass, green, hill, red |
| Human annotation | bed, girl, woman | animal, bear, black, brown, head, nose | band, light, man, music, red, wheel | black, man, old, red, sit | cloud, gray, green, mountain, picture, rock, sky, stone |

# ANNOTATING IMAGES

CROSS-REFERENCE TO RELATED APPLICATIONS

This application is a continuation of and claims the benefit of U.S. patent application Ser. No. 12/425,910 entitled "Annotating Images," filed Apr. 17, 2009, which in turn claims the benefit under 35 U.S.C. §119(e) of U.S. patent application Ser. No. 61/059,702 entitled "Annotating Images," filed Jun. 6, 2008, the disclosures of which are incorporated herein by reference in their entirety.

BACKGROUND

This specification relates to image annotation.

Text-based image annotation continues to be an important practical as well as fundamental problem in the computer vision and information retrieval communities. From the practical perspective, current image search solutions fail to use image content effectively for image search. This often leads to search results of limited applicability.

Given an input image, the goal of automatic image annotation is to assign a few relevant text keywords (also referred to as labels) to the image that reflect its visual content. Keywords can be assigned to (or associated with) an image by storing the keywords as metadata in any of a variety of ways, for example, in a digital file that includes the image, in a database with links or references from the keywords to the image, in an XML file with data linking the keywords and the image, or otherwise.

With rapidly increasing collections of image data on and off the Web, robust image search and retrieval is fast becoming a critical requirement. Current Internet image search engines generally exploit text-based search to retrieve relevant images, while ignoring image content. Utilizing image content to assign a richer, more relevant set of keywords can allow one to further exploit the fast indexing and retrieval architecture of these search engines for improved image search. This makes the problem of annotating images with relevant text keywords of immense practical interest.

SUMMARY

This specification describes technologies relating to annotating images automatically.

In general, one aspect of the subject matter described in this specification can be embodied in a method of image annotation performed by a data processing apparatus that includes receiving an input image in the data processing apparatus, identifying one or more nearest neighbor images of the input image from among a collection of digital images stored on computer-readable media by operation of the data processing apparatus, in which each of the one or more nearest neighbor images is associated with a respective one or more image labels, assigning a plurality of image labels to the input image, in which the plurality of image labels are selected by the data processing apparatus from the image labels associated with the one or more nearest neighbor images, and storing in a data repository the input image and an association of the input image with the assigned plurality of image labels.

In another aspect, a computer-implemented method includes receiving an input image, identifying multiple ranked nearest neighbor images of the input image from among a collection of images, in which each of the ranked nearest neighbor images is associated with a respective one or more image labels, assigning a single image label to the input image, in which the single image label is selected from the image labels associated with the multiple ranked nearest neighbor images, and storing in a data repository the input image having the assigned single image label. Other embodiments of the foregoing aspects include corresponding systems, apparatus, and computer program products.

In another aspect, a system includes means for determining that one or more reference images are nearest neighbor images of an input image, the one or more reference images collectively being associated with multiple image labels, and means for assigning two or more image labels to the input image, the two or more image labels being selected from among the multiple image labels associated with one or more reference images. Each of the one or more images can be associated with a plurality of image labels. These and other embodiments can optionally include one or more of the following features. The plurality of images can be selected from a single nearest neighbor image.

Assigning a plurality of image labels can include sorting the multiple nearest neighbor images according to a respective whole-image distance associated with each nearest neighbor image. Each whole-image distance may represent a degree of difference between the input image and a corresponding nearest neighbor image.

Assigning the plurality of image labels can further include ranking one or more first image labels according to a respective frequency of occurrence in the collection of digital images, in which each of the one or more first image labels is associated with a first nearest neighbor; and assigning at least one of the first image labels to the input image based on the ranking of the one or more first image labels.

Assigning the plurality of image labels also can include ranking one or more second image labels, in which each of the second image labels is associated with one or more remaining nearest neighbor image, and assigning at least one of the second image labels to the input image based on the ranking of the one or more second image labels.

The ranking of the one or more second image labels can include sorting the one or more second image labels according to a co-occurrence of each of the second image labels with each first image label in the collection of digital images. Alternatively, or in addition, the ranking of the one or more second image labels can include sorting the one or more second image labels according to a local frequency of each of the second image labels in the one or more remaining nearest neighbor images.

The whole-image distance can include a combination of feature distances, each feature distance representing a degree of difference between an image feature associated with the input image and a respective image feature associated with the reference image. The image feature associated with the input image and the respective image feature associated with the reference image each can comprise a global image feature. Alternatively, or in addition the image feature associated with the input image and the respective image feature associated with the reference image each can include a local image feature.

The whole-image distance can be derived as an average of the feature distances. The average can be based on a substantially equal contribution from each of the feature distances. The average can based on a weighted contribution from each of the feature distances. The weighting for each of the feature distances can be calculated based on the collection of digital images, in which the collection of digital images is a group of training images comprising pairs of similar and dissimilar images.

At least one of the feature distances can be calculated as a difference between a texture feature of the input image and a corresponding texture feature of the reference image. At least one of the feature distances can be calculated as a difference between a color feature of the input image and a corresponding color feature of the reference image.

Particular embodiments of the subject matter described in this specification can be implemented to realize one or more of the following advantages. In some cases, the image annotation techniques are characterized by a minimal training requirement. In certain implementations, treating image annotation as a retrieval problem simplifies the annotation process.

The details of one or more embodiments of the invention are set forth in the accompanying drawings and the description below. Other features, aspects, and advantages of the invention will become apparent from the description, the drawings, and the claims.

DETAILED DESCRIPTION

Automatically assigning keywords to images allows one to retrieve, index, organize and understand large collections of image data. This specification describes techniques for image annotation that treat annotation as a retrieval problem. The techniques utilize low-level image features and a simple combination of basic distance measures to find nearest neighbors of a given image. The keywords are then assigned using a greedy label transfer mechanism.

Image annotation is a difficult task for two main reasons: First, there is a pixel-to-predicate or semantic gap problem, in which extraction of semantically meaningful entities using just low level image features, e.g., color and texture, is difficult. Doing explicit recognition of thousands of objects or classes reliably is currently an unsolved problem. The second difficulty arises due to the lack of correspondence between the keywords and image regions in training data. For each image, one has access to the keywords assigned to the entire image, and it is not known which regions of the image correspond to these keywords. This can preclude direct learning of classifiers in which each keyword is considered to be a separate class.

This specification describes techniques that are characterized by a minimal training requirement. The techniques outperform complex state-of-the art image annotation methods on several standard datasets, as well as a large Web dataset.

Figure 1:
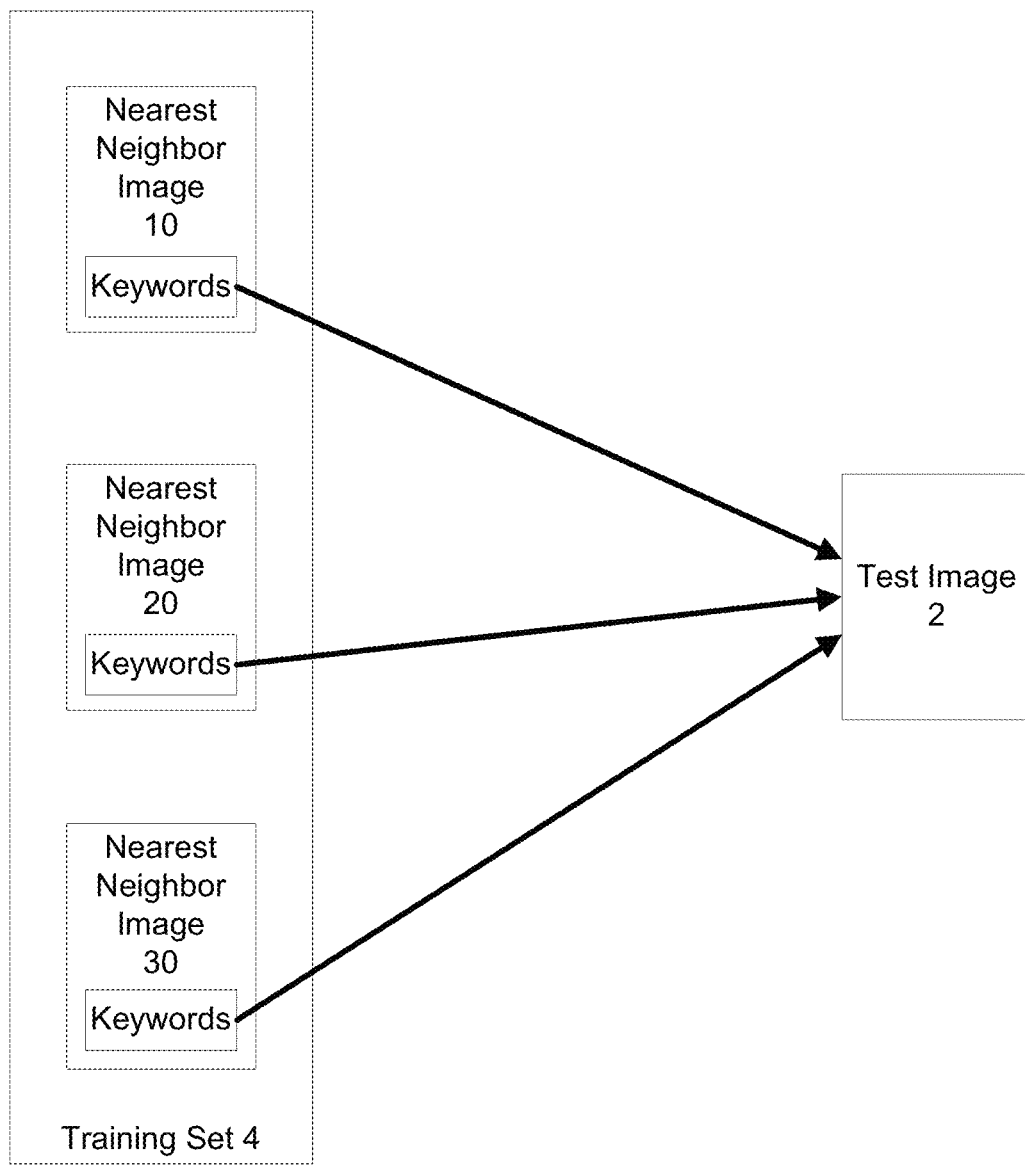
FIG. 1 illustrates an example of annotating a test image with keywords.

FIG. 1 illustrates an example of annotating a test image with keywords. Given a test image 2, one can find its nearest neighbor(s) (e.g., first nearest neighbor 10, second nearest neighbor 20, and third nearest neighbor 30, defined in some feature space with a pre-specified distance measure) from a training set 4 of images, and assign some or all of the keywords associated with the nearest neighbor image(s) to the input test image 2. In some cases, using simple distance measures defined on global image features performs better than other annotation techniques. In some implementations, K-nearest neighbors are used to assign the keywords instead of just the nearest one. In the multiple neighbors case, the appropriate keywords can be assigned to the input image using a greedy approach, further enhancing the annotation performance.

The K-nearest neighbor approach can be extended to incorporate multiple distance measures, which can be defined over distinct feature spaces. Combining different distances or kernels can yield good performance in object recognition tasks. Two different ways of combining different distances to create the annotation methods will be described. The first one computes the average of different distances after scaling each distance appropriately. The second one is based on selecting relevant distances using a sparse logistic regression method known as Lasso. For the regression method, a training set containing similar and dissimilar images can be used. A typical training set provided for the annotation task does not contain such information directly. In some implementations, Lasso is trained by creating a labeled set from the annotation training data. Even such a weakly trained Lasso provides good performance. In some cases, the averaged distance technique performs as well or better than the noisy Lasso technique.

A family of methods for image annotation will now be described in which the methods are built on the premise that images similar in appearance are likely to share keywords. To this end, image annotation is includes a process of transferring keywords from nearest neighbors. The neighborhood structure is constructed using image features, resulting in a rudimentary model that depends on the notion of distances between respective features in an input image and a corresponding reference image.

Figure 2A:
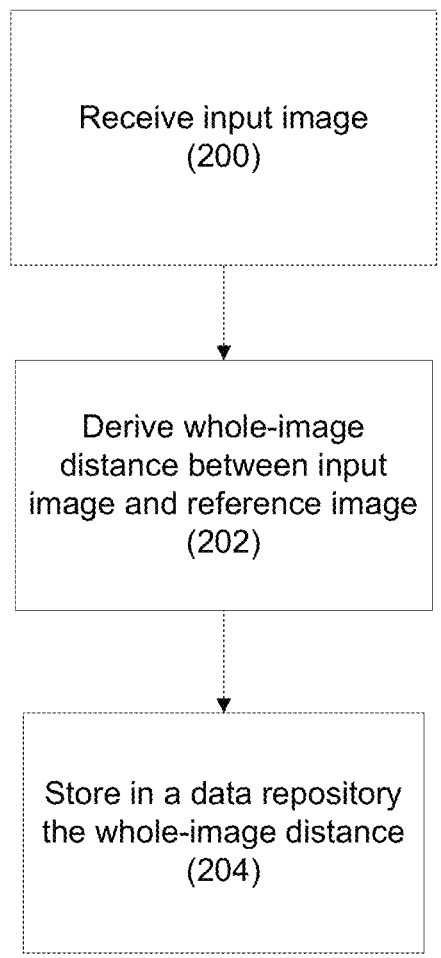
FIG. 2A is a flow chart providing a general overview of determining the nearest neighbors of an input image.

FIG. 2A is a flow chart providing a general overview of determining the nearest neighbors of an input image. A server implemented on one or more computers is operable to receive (200) a digital input image. The server may also receive a collection of digital images of which one or more reference images are selected. The digital images can be stored in a data repository of the server or on other computer-readable media. The server then derives (202) a whole-image distance between the input image and the reference image that is selected from the collection of digital images. The whole-image distance represents a degree of difference between the input image as a whole and the reference image as a whole with reference to a plurality of image features. The whole-image distance then is stored (204) in a digital data repository of the server.

Image features can be either global (generated from the entire image), or local (generated from interest points). Examples of global image features include color and texture. Color and texture are two low-level visual cues for image representation. Common color descriptors are based on coarse histograms of pixel color values. These color features can be utilized within image matching and indexing schemes, primarily due to their effectiveness and simplicity of computation. Texture is another low-level visual feature that can be a component of image representation. Image texture can be captured with Wavelet features. In particular, Gabor and Haar wavelets are quite effective in creating sparse yet discriminative image features. To limit the influence and biases of individual features, and to maximize the amount of information extracted, a number of simple and easy to compute color and texture features are employed.

Features from images in three different color spaces are generated. These include Red-Green-Blue (RGB), Hue-Saturation-Value (HSV), and CIE 1976 L, a*, b* (LAB) color space. While RGB is the default color space for image capturing and display, both HSV and LAB isolate important appearance characteristics not captured by RGB. For example, the HSV color space encodes the amount of light illuminating a color in the Value channel, and the Luminance channel of LAB is intended to reflect the human perception of brightness. The RGB feature is computed as a normalized 3D histogram of RGB pixel values, with 16 bins in each channel. Similarly, the HSV (and LAB) feature is a 16-bin-per-channel histogram in HSV (and LAB) color space. To determine the distance measures used for each color space, three distance measures, used for histograms and distributions (KL-divergence, $L_1$-distance, and $L_2$-distance), were evaluated on the human-labeled training data from the Corel5K dataset. The KL-divergence is a non-commutative measure of the difference between two probability distributions. If the two distributions of a discrete random variable are P1 and P2, then the KL divergence is computed as sum_i (P1[i]*log(P1[i]/P2[i])). $L_1$ performed the best for RGB and HSV, while KL-divergence was found suitable for LAB distances. Throughout the remainder of this disclosure, RGB and HSV distances imply the $L_1$ (Manhattan) measure, and the LAB distance implies KL-divergence. Other distance measures can be used as well. For example, in some cases, a cosine distance measure or earth mover's distance (EMD) can be used.

The texture of an image can be represented with Gabor and Haar Wavelets. In the present implementation, each image is filtered with Gabor wavelets at three scales and four orientations. The twelve response images are divided into non-overlapping regions, and the mean response magnitudes from each region are concatenated into a feature vector (throughout the text this feature is referred to as 'Gabor'). The second feature captures the quantized Gabor phase. The phase angle at each response pixel is averaged over 16×16 blocks in each of the twelve Gabor response images. These mean phase angles are quantized to 3 bits (eight values), and are concatenated into a feature vector (referred to throughout the text as 'GaborQ'). The $L_1$ distance is used for the Gabor and GaborQ features.

The Haar filter is a 2×2 edge filter. Haar Wavelet responses are generated by block-convolution of an image with Haar filters at three different orientations (horizontal, diagonal, and vertical). Responses at different scales were obtained by performing the convolution with a suitably subsampled image. After rescaling an image to size 64×64 pixels, a Haar feature is generated by concatenating the Haar response magnitudes (this feature is referred to as just 'Haar'). As with the Gabor features, a quantized version was also considered, where the sign of the Haar responses are quantized to three values (either 0, 1, or −1 if the response is zero, positive, or negative, respectively). Throughout the remainder of this disclosure, this quantized feature is referred to as 'HaarQ.' The $L_1$ distance is used for the Haar and HaarQ features, as with the Gabor features.

Other examples of global image features include: 1) "Tiny Images," which are images shrunk down to a very small size (e.g., thumbnails) and compared pixel-by-pixel; 2) Gist transforms, which are similar to wavelet transforms and capture responses to steerable filters; 3) distributions of geometric features, such as the statistics of lines or other contours; and 4) histograms of gradient orientations for entire images. Other global image features can be used as well. The distance measures for the foregoing global image features can include, for example, L1, L2, KL divergence, cosine and EMD.

Regarding local features, there are two components to obtaining features from an image: First, there is "interest point detection", in which the location of points or regions in an image which will be useful for matching or comparing between images are identified. For example, corners are common interest points. Examples of interest point detection techniques include, but are not limited to, edge detection, blob detection, ridge detection and affine-invariant detection. The second step is "feature extraction", in which descriptive feature vectors are generated from the interest points. For example, a feature vector can describe the color distribution in the neighborhood of a corner, or the feature vector can describe the angle of the corner. Examples of other local descriptive features include, but are not limited to, scale-invariant (e.g., SIFT descriptor), rotation-invariant, gradient magnitude, gradient orientation and speeded up robust features (e.g., SURF descriptor).

As explained above, each image in the present implementation is represented with seven image features (e.g., 3 color histograms, and 4 texture features). The distance between corresponding image features in different images is a "basic distance." A "composite distance" is a distance measure between images that incorporates some or all of the seven features. In some implementations, the composite distance can include additional features.

Figure 2B:
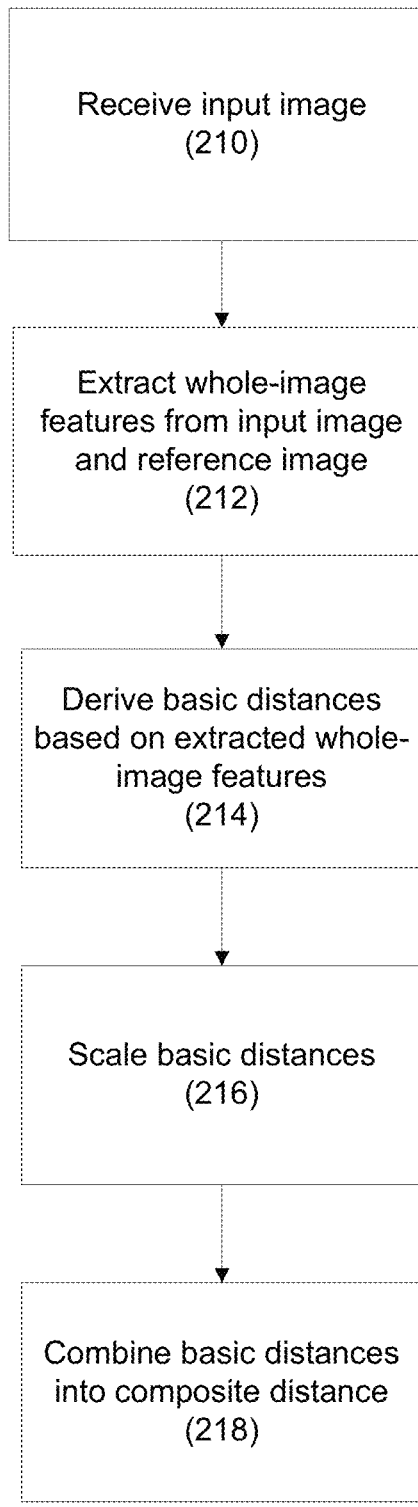
FIG. 2B is a flow chart providing an overview of deriving the composite distance.

FIG. 2B is a flow chart providing an overview of deriving the composite distance. As before, a server implemented on one or more computers receives (210) an input image and a reference image. Subsequently, seven whole-image features are extracted (212) from each of the input and reference images. The extracted features include three color features and four texture features. The color features include a histogram of image colors in RGB color space, a histogram of image colors in HSV color space and a histogram of image colors in LAB color space. The texture features include a vector of the magnitude of the Gabor response, a vector of the quantized phase of the Gabor response, a vector of the magnitude of the Haar response, and a vector of the sign of the Haar response.

Basic distances then are derived (214) based on the features extracted from the input and reference image. For the RGB color space, the basic distance is the $L_1$ distance between each of the RGB feature vectors. The $L_1$ distance is sometimes referred to as the Manhattan or city block distance. Similarly, the basic distance for the HSV color space is the $L_1$ distance between the HSV feature vectors. The basic distance for the LAB color space is the KL-divergence between the LAB feature vectors.

The basic distances between the Gabor, GaborQ, Haar and HaarQ features of the input and reference image are determined using the $L_1$ distance measurement. The distance measures used for each feature ($L_1$, KL-divergence) were determined by evaluating each feature's performance on a small training set for a few different distance measures, and selecting the best for each feature. Distance measures other than $L_1$ and KL-divergence also can be used to compute the basic distances. For example, any Lp distance could have been used, a histogram intersection, or earth mover's distance (EMD), which is a mathematical measure of the difference between two distributions over some region.

After obtaining the basic distances for each whole-image feature, the distances are scaled (216). For each of the seven feature types, the scaling terms are determined from training data that will ensure the basic distances are bounded between 0 and 1, i.e., the basic distances are normalized.

The scaled basic distances then are combined (218) into a composite distance. A simple baseline method includes, for example, a linear combination of basic distances to yield the composite distance measure. That is, the composite distance between the input image and the reference image is the averaged sum of the seven basic distances. Although seven features are used, the algorithm can work easily with any number of features (including one).

In one embodiment, the linear combination is obtained by allowing each basic distance to contribute equally to the total combined distance. This method is called Joint Equal Contribution (JEC). In another embodiment, the basic distances are combined non-uniformly, giving preference to those features which are more relevant for capturing image similarity, i.e., weighting the basic distances. The weights for combining basic distances can be obtained using the sparse logistic regression technique, Lasso. Additional methods can be utilized as well. For example, in some embodiments the linear combination is based on a max-margin approach as described in Frome et al., "Learning Globally-Consistent Local Distance Functions for Shape-Based Image Retrieval and Classification," International Conference on Computer Vision 2007.

If labeled training data is unavailable, or if the labels are extremely noisy, a simple way to combine distances from different features is to use the JEC method, in which each individual basic distance contributes equally to the total combined cost or distance. Let $I_i$ be the i-th image, and say extracted N features $F_i = f_i^1, \ldots, f_i^N$ (in our case N=7) have been extracted. The basic distance, $d_{(i,j)}^k$ is computed between corresponding features $f_i^k$ and $f_j^k$ in two images $I_i$ and $I_j$. The N individual basic distances $d_{(i,j)}^k$, k=1, ..., N are combined to provide a comprehensive distance between image $I_i$ and $I_j$. In JEC, where each basic distance is scaled to fall between 0 and 1, each scaled basic distance contributes equally. The scaling terms can be determined empirically from the training data. If $\tilde{d}_{(i,j)}^k$ denotes the distance that has been appropriately scaled, the comprehensive image distance between images $I_i$ and $I_j$ can be defined as $$\frac{1}{N}\sum_{k=1}^{N} \tilde{d}_{(i,j)}^k.$$

This distance is the Joint Equal Contribution or simply JEC.

Another approach to combining feature distances would be to identify those features that are more relevant for capturing image similarity. Since the different color (and texture) features are not completely independent, it is preferable to determine which color (or texture) features are redundant. Logistic regression with $L_1$ penalty, (i.e., Lasso), can provide a simple way to determine the relevancy of different features.

To apply logistic regression for feature selection, the image annotation scenario should be transformed into something that can be used for Lasso training To this end, a new set X is defined, and each data point $x_l \in X$ is a pair of images ($I_i$, $I_j$). The training set is given by $X = \{x_l = (I_i, I_j) | I_i, I_j \in S, i \neq j\}$, where S is the input set of all training images. Let $y_l \in \{+1, -1\}$ be the label attached to each training point $x_l$. If a pair contains 'similar' images, then $x_l$ is assigned the label $y_l = 1$, otherwise $y_l = -1$. In Lasso, the optimal weights $$(\hat{\omega})$$

are obtained by minimizing the following penalized, negative log-likelihood:

$$\hat{\omega} = \operatorname*{argmin}_{\omega} \sum_{l=1}^{L} \log(1 + \exp(-\omega^T d_{xl} y_l)) + \lambda |\omega|_1 \quad (1)$$

Here L is the number of image pairs used for training, $|\bullet|_1$ is the $L_1$ norm, $d_{xl}$ is the vector containing the individual basic distances for the image pair $x_l$, and X is a positive weighting parameter tuned via cross-validation. Given the training data $\{(x_l, y_l)\}$, equation (a) can be solved by converting this into a constrained optimization problem. A linear combination of basic distances using the weights computed in (1) provides a measure of image similarity, so the result is negated to yield the corresponding distance.

Figure 4:
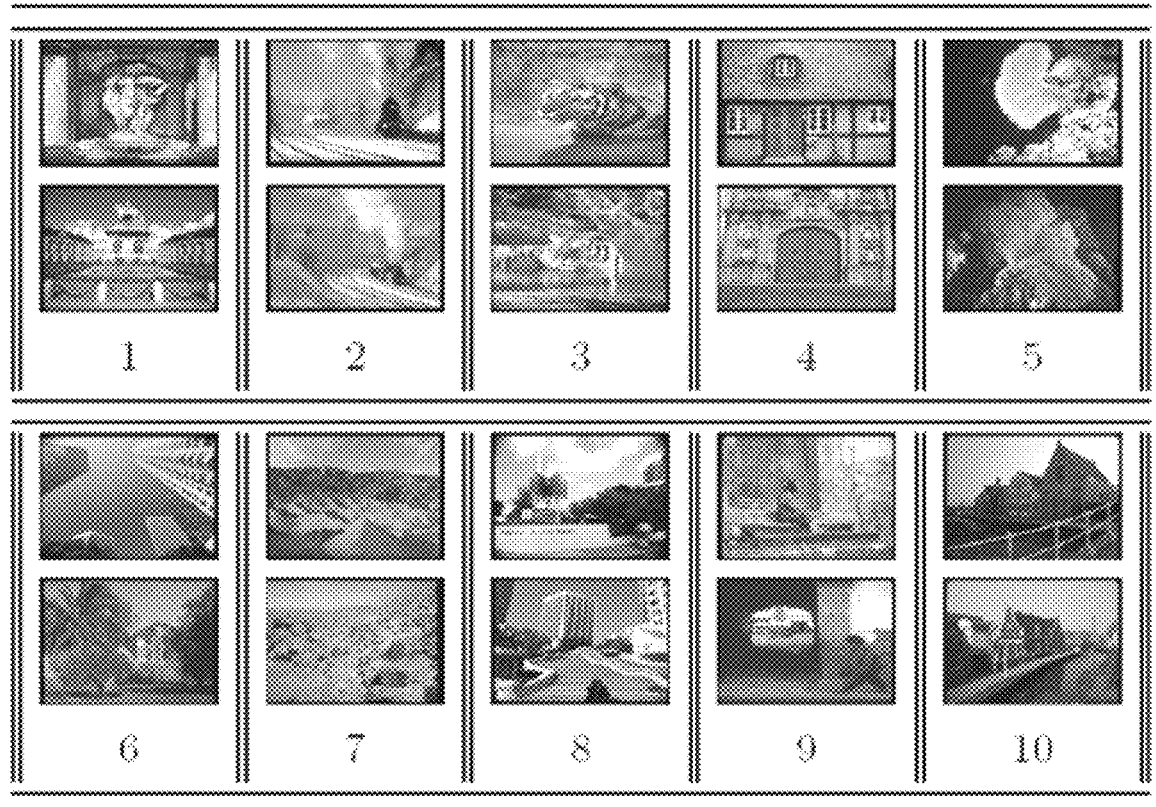
FIG. 4 shows an example of images pairs that have at least 4 keywords in common.
Figure 5:
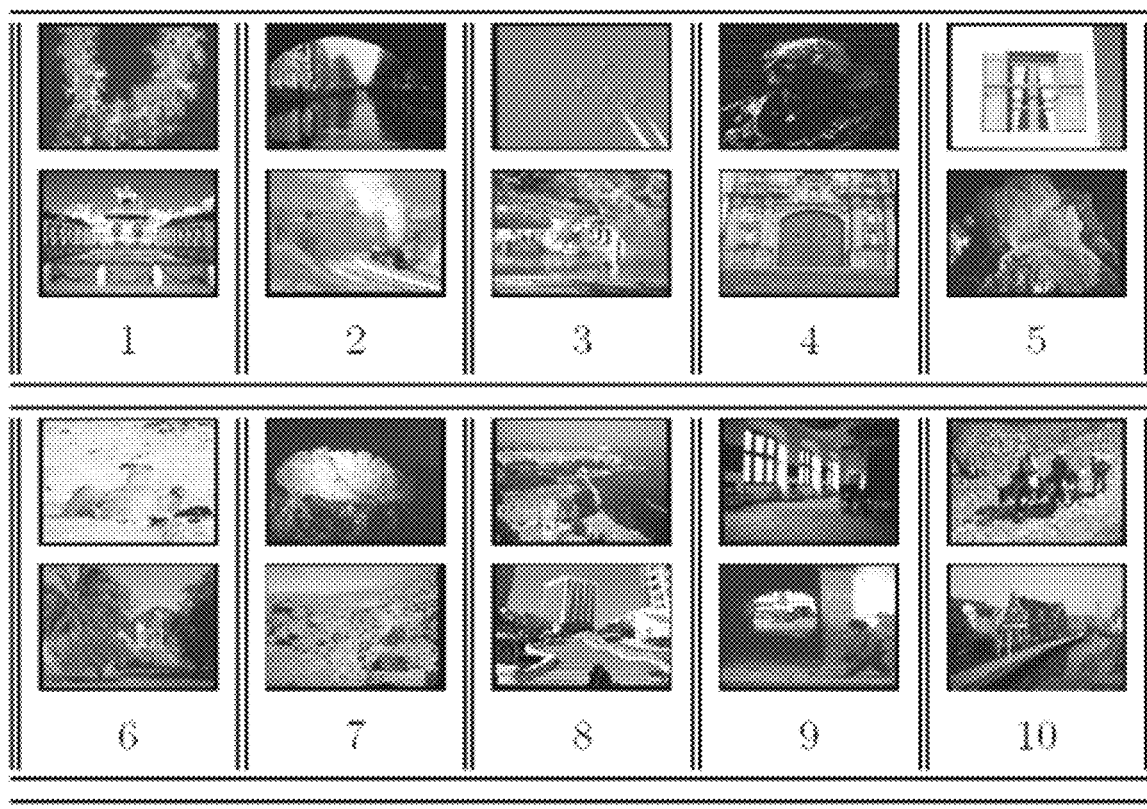
FIG. 5 shows an example of image pairs that have zero keywords in common.

A challenge in applying the foregoing scheme to image annotation lies in creating a training set containing pairs of similar and dissimilar images. The typical image annotation datasets do not have this information since each image contains just a few text keywords, and there is no notion of similarity (or dissimilarity) between images. In this setting, any pair of images that share enough keywords are a positive training example, and any pair with no keywords in common are a negative example. The quality of such a training set will depend on the number of keywords required to match before an image pair can be called 'similar.' A higher threshold will ensure a cleaner training set but reduce the number of positive pairs. On the contrary, a lower threshold will generate enough positive pairs for training at the cost of the quality of these pairs. In this work, training samples were obtained from the designated training set of the Corel5K benchmark. Images that had at least four keywords in common were treated as positive samples for training FIG. 4 shows an example of images pairs that have at least 4 keywords, and FIG. 5 shows an example of image pairs that have zero keywords in common. Note that a larger overlap in keywords does not always translate into better image similarity, implying that the training set is inherently noisy. Combining basic distances using JEC or Lasso provides a simple way to compute distances between images. Using such composite distances, it is possible to find the K nearest neighbors of an image from the test set in the training set. Subsequently, keywords then are assigned to the test image from its nearest neighbor images.

Figure 3:
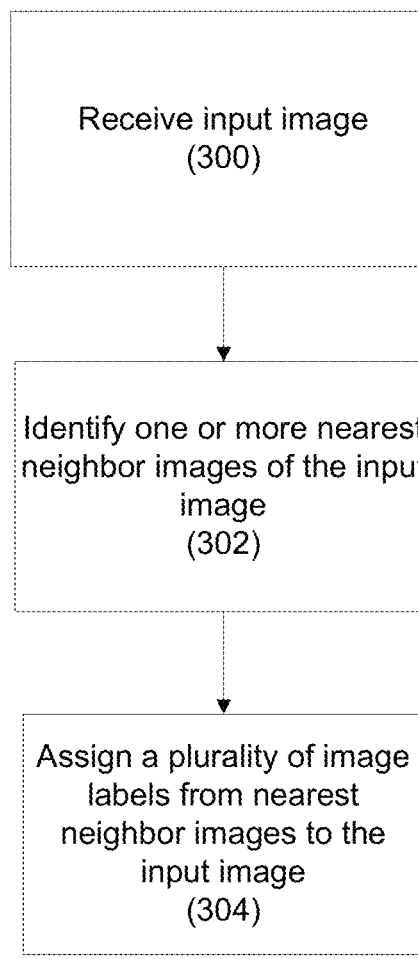
FIG. 3 is a flow chart providing a general overview of transferring keywords from the nearest neighbors of an input image to the input image.

FIG. 3 is a flow chart providing a general overview of transferring keywords from the nearest neighbors of an input image to the input image. A server implemented on one or more computers receives (300) an input image and, in some implementations, a collection of reference images. The server then identifies (302) one or more nearest neighbor images of the input image from among a collection of images, in which each of the one or more nearest neighbor images is associated with a respective one or more image labels. The server then assigns (304) a plurality of image labels to the input image, in which the plurality of image labels are selected from the image labels associated with one or more of the nearest neighbor images. The input image having the assigned plurality of image labels then is stored (306) in a digital data repository of the server. Metadata containing the labels can be stored with the input image in the repository or elsewhere. A simple method to transfer n keywords to a query image I from the query's K nearest neighbors in the training set is disclosed as follows. Let $I_i$, $i \in 1, \ldots, K$ be the K nearest neighbors of I in the training set, ordered according to increasing distance (i.e. $I_1$ is the most similar image). The number of keywords associated with $I_i$ is denoted by $|I_i|$. The steps of the greedy label transfer algorithm include:

1. Score each keyword of the nearest neighbor $I_1$ according to the keyword's frequency in the training set.

2. Of the $|I_1|$ keywords of $I_1$, transfer the n highest scoring keywords to query $\tilde{I}$. If $|I_1| < n$, we still need to transfer more keywords, so proceed to step 3.

3. Rank each keyword of neighbors $I_2$ through $I_K$ according to two factors: 1) their co-occurrence in the training set with the keywords transferred in step 2, and 2) their local frequency (how often they appear as keywords of images $I_2$ through $I_K$). The product of these two factors, after normalization, provides the score necessary for ranking these keywords. Based on this keyword ranking, select the best n−$|I_1|$ keywords to transfer to the query $\tilde{I}$. Essentially, the label transfer scheme applies all keywords of the first nearest neighbor. If more keywords are needed, then they are selected from neighbors 2 through N (based on two factors: co-occurrence and frequency).

In summary, the described implementations of image annotation method include the following steps. First, a composite image distance (computed with JEC or Lasso) is used to identify nearest neighbors of an input image. Next, the desired number of keywords are transferred from the nearest neighbors to the input image.

Figure 6:
FIGS. 6 and 7 show example images from separate image datasets.
Figure 7:
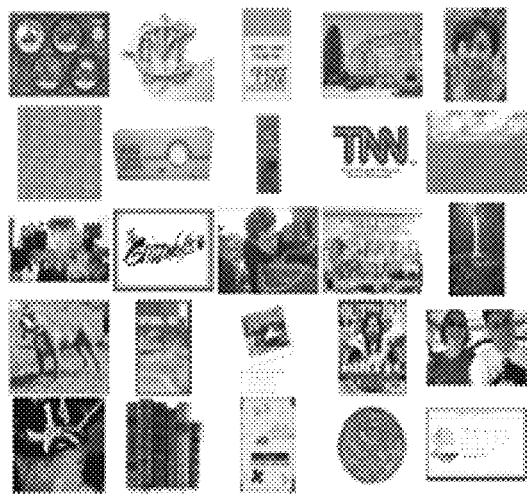
Figure 7:
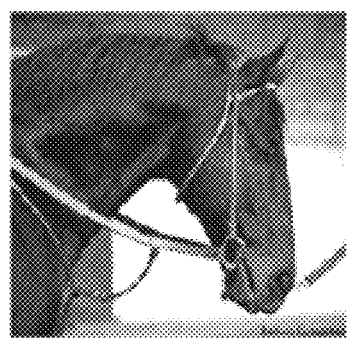
Figure 7:

The performance of the image annotation methods were evaluated on different image datasets. FIGS. 6 and 7 show example images from two separate image datasets: the Corel5K set and the ESP set. The images in FIG. 6 are from the Corel5K dataset which has become the de facto evaluation benchmark in the image annotation community. On the left are 25 randomly selected images from the dataset. On the right are two sample images and their associated annotations. The set contains 5000 images collected from the larger Corel CD set. The set is annotated from a dictionary of 374 keywords, with each image having been annotated with between one and five keywords, and on average 3.5 keywords. Out of 374 keywords, only 260 appear in the test set.

The images in FIG. 7 are from the ESP image dataset. On the left are 25 randomly selected images from the dataset. On the right are two images and their associated annotations. The ESP set consists of 21844 images collected from an ESP collaborative image labeling game. The ESP game is a two-player game, where both players, without the ability to communicate with each other, are asked to assign labels to the same image. As soon as they have one label in common, they are given credit for successfully labeling the image and are presented with the next image. Thus, at most one label is obtained each time an image is shown to a pair of players. As each image is shown to more players, a list of taboo words is generated. Subsequent players of the game are not allowed to assign taboo words when shown the same image. These rules ensure that each image will be assigned many different labels by many different players. The set used contains a wide variety of images of natural scenes, man-made scenes, and objects annotated by 269 keywords. Each image is annotated with at least one keyword, at most 15 keywords, and on average 4.6 keywords.

Figure 8:
FIG. 8 shows examples of annotated images.
Figure 8:
Figure 8:
Figure 8:
Figure 8:

Five keywords are assigned to each image using label transfer. In one embodiment, the JEC scheme was used with the label transfer algorithm, to assign five keywords to each test image in the Corel5K dataset. FIG. 8 shows examples of annotated images, i.e., a comparison of predicted keywords against the ground-truth (e.g., human-assigned) keywords for a number of sample images. Since the human-annotations often contain less than five keywords, in some cases JEC predicts keywords that are not in the ground-truth set but correctly describe the image content nonetheless. For example, the first image in the figure is predicted to have the keyword formation. Arguably, this is a correct description of the planes in the image even though it is not one of the human-assigned keywords.

Figure 9:
FIG. 9 shows examples of annotated images.
Figure 9:
Figure 9:
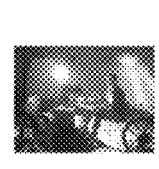
Figure 9:
Figure 9:
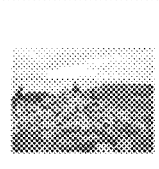

FIG. 9 shows examples of annotated images. The images were annotated using the JEC scheme with the ESP image dataset. Although the predicted keywords using the JEC annotation method do not overlap perfectly with the human annotation, in many cases the "incorrect" predicted keywords correctly describe the image. For example, in the fourth image showing a man sitting on couch in front of a wall full of framed pictures, the JEC-assigned keywords arguably describe the image as (or more) accurately than those generated through the ESP game.

A challenge in the image annotation task is knowing how many keywords are necessary to describe the content of an image. Assigning only 5 keywords during the label transfer stage artificially limits the number keywords that can be recalled correctly for many of the images. Although increasing the number of keywords assigned to an image can help increase the recall (e.g., in the extreme case, if all keywords were assigned to each image in an image dataset, then 100% recall could be ensured for all keywords), it will lead to a drop-off in the precision. In order to assign more than 5 keywords to an image using the annotation methods, the number of nearest neighbors used during the label transfer stage is established as the minimum required to see enough unique keywords. However, this can lead to a drop in precision as the recall increases. This is due to the fact that the nearest neighbor structure is used for label transfer, which makes sense for a small number of neighbors. However, it introduces more errors as the number of neighbors is increased, which is necessary for assigning many keywords.

Figure 10:
FIGS. 10, 11 and 12 show examples of a first few images retrieved for a number of different keywords in three different image datasets, respectively.
Figure 11:
Figure 12:
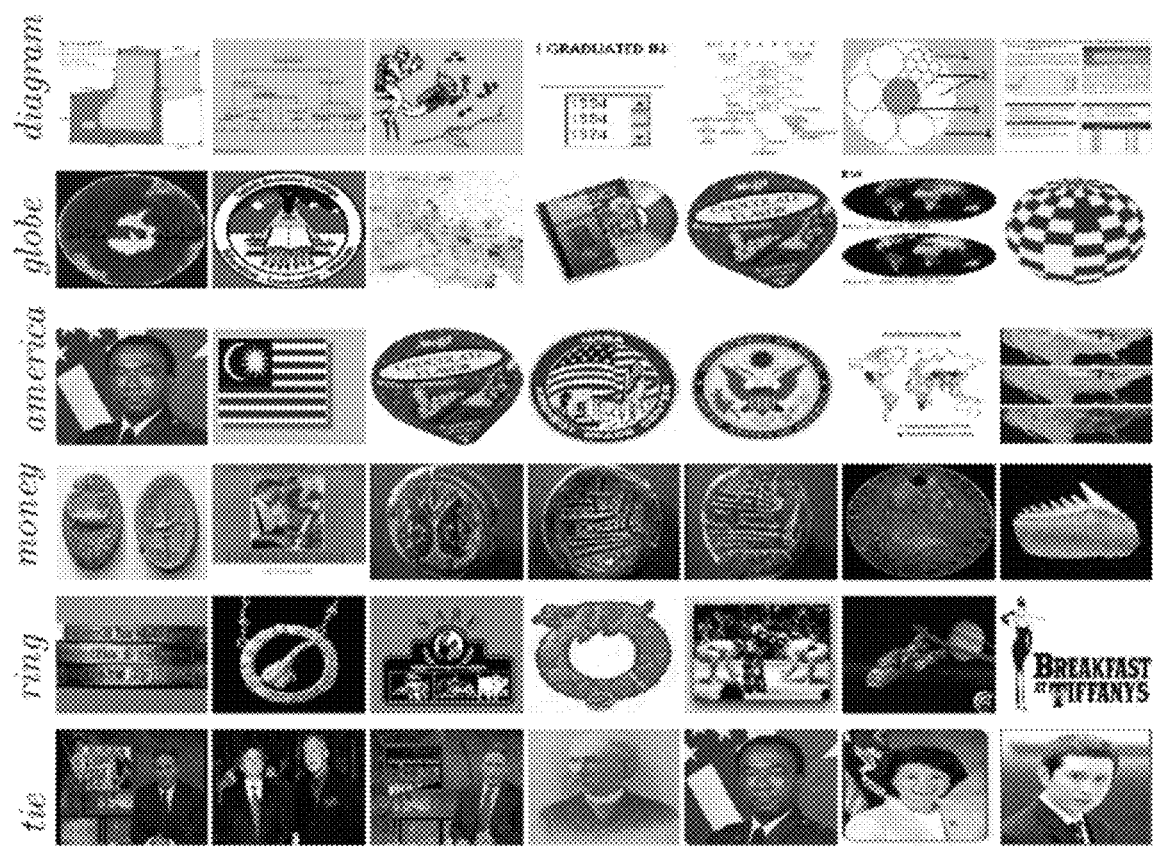

Assigning descriptive keywords to images allows users to search for images using only text-based queries. Evaluating the performance of an image retrieval engine is different than that of an annotation engine because in retrieval, the interest only is in the quality of the first few images associated with a given keyword. FIGS. 10, 11 and 12 show examples of a first few images retrieved for a number of different keywords in three different image datasets, respectively.

Even for particularly challenging keywords (e.g. cyclist, skull, diagram and tie), many of the top retrieved images are correct. Also, many keywords have multiple meanings, commonly referred to as "word sense". In some such cases, the retrieved images span numerous meanings of the word. For example, the retrieved images for keyword ring in FIG. 12 represent a few different meanings of the word 'ring'.

The proposed image annotation methods combine basic distance measures over very simple global color and texture features. K-Nearest Neighbors computed using these combined distances form the basis of a simple greedy label transfer algorithm.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method of image annotation performed by a data processing apparatus, the method comprising:
    receiving an input image in the data processing apparatus;
    identifying one or more nearest neighbor images of the input image from among a collection of digital images stored on computer-readable media by operation of the data processing apparatus, each of the one or more nearest neighbor images being associated with a respective one or more image labels, wherein the collection of digital images comprises a plurality of reference images, and wherein identifying the one or more nearest neighbor images comprises:
        calculating, for each reference image, a whole-image distance between the input image and the reference image as $$\frac{1}{N}\sum_{k=1}^{N} \tilde{d}^k,$$

wherein N is a number of image features extracted from both the input image and the reference image, and $\tilde{d}^k$ is a weighted feature distance representing a degree of difference between a $k^{th}$ image feature extracted from the input image and a corresponding $k^{th}$ image feature extracted from the reference image, and
        identifying one or more reference images closest to the input image, as measured by the whole-image distances, as the one or more nearest neighbors;
    assigning a plurality of image labels to the input image, wherein the plurality of image labels are selected by the data processing apparatus from the image labels associated with the one or more nearest neighbor images;
    estimating a weighting vector w that minimizes the expression $$\sum_{l=1}^{L} \log(1 + \exp(-\omega^T d_{x1} y_l)) + \lambda|\omega|_1,$$

wherein L is a number of training image pairs in a training image set, $d_{xl}$ is a vector containing feature distances for the $l^{th}$ training image pair, $\lambda$ is a positive weighting parameter, and $y_l$ is +1 or −1 according to whether the $l^{th}$ training image pair is a pair of similar or dissimilar training images; and
    storing in a digital data repository the input image having the assigned plurality of image labels.

2. The method of claim 1, wherein $y_l$ is +1 when the $l^{th}$ training image pair is a pair of similar training images and $y_l$ is −1 when the $l^{th}$ training image pair is a pair of dissimilar training images.

3. A system comprising:
    a server implemented on one or more computers and operable to perform operations comprising;
    receiving an input image in the server;
    identifying one or more nearest neighbor images of the input image from among a collection of digital images stored on computer-readable media by operation of the server, each of the one or more nearest neighbor images being associated with a respective one or more image labels, wherein the collection of digital images comprises a plurality of reference images, and wherein identifying the one or more nearest neighbor images comprises:
        calculating, for each reference image, a whole-image distance between the input image and the reference image as $$\frac{1}{N}\sum_{k=1}^{N} \tilde{d}^k,$$

wherein N is a number of image features extracted from both the input image and the reference image, and $\tilde{d}^k$ is a weighted feature distance representing a degree of difference between a $k^{th}$ image feature extracted from the input image and a corresponding $k^{th}$ image feature extracted from the reference image, and
        identifying one or more reference images closest to the input image, as measured by the whole-image distances, as the one or more nearest neighbors;
    assigning a plurality of image labels to the input image, wherein the plurality of image labels are selected by the server from the image labels associated with the one or more nearest neighbor images;
    wherein the server is operable to perform operations further comprising estimating a weighting vector ω that minimizes the expression $$\sum_{l=1}^{L} \log(1 + \exp(-\omega^T d_{x1} y_l)) + \lambda|\omega|_1,$$

wherein L is a number of training image pairs in a training image set, $d_{x1}$ is a vector containing feature distances for the $l^{th}$ training image pair, $\lambda$ is a positive weighting parameter, and $y_l$ is +1 or −1 according to whether the $l^{th}$ training image pair is a pair of similar or dissimilar training images; and
    storing in a digital data repository the input image having the assigned plurality of image labels.

4. A non-transitory computer storage medium encoded with a computer program, the program comprising instructions that when executed by data processing apparatus cause the data processing apparatus to perform operations comprising:

receiving an input image in the data processing apparatus;

identifying one or more nearest neighbor images of the input image from among a collection of digital images stored on computer-readable media by operation of the data processing apparatus, each of the one or more nearest neighbor images being associated with a respective one or more image labels, wherein the collection of digital images comprises a plurality of reference images, and wherein identifying the one or more nearest neighbor images comprises:

calculating, for each reference image, a whole-image distance between the input image and the reference image as, wherein N is a number of image features extracted from both the input image and the reference image, and is a weighted feature distance representing a degree of difference between a kth image feature extracted from the input image and a corresponding kth image feature extracted from the reference image, and identifying one or more reference images closest to the input image, as measured by the whole-image distances, as the one or more nearest neighbors;

assigning a plurality of image labels to the input image, wherein the plurality of image labels are selected by the data processing apparatus from the image labels associated with the one or more nearest neighbor images; and estimating a weighting vector $\omega$ that minimizes the expression $$\sum_{l=1}^{L} \log(1 + \exp(-\omega^T d_{x1} y_l)) + \lambda |\omega|_1,$$

wherein L is a number of training image pairs in a training image set, $d_{xl}$ is a vector containing feature distances for the $l^{th}$ training image pair, $\lambda$ is a positive weighting parameter, and $y_l$ is +1 or −1 according to whether the $l^{th}$ training image pair is a pair of similar or dissimilar training images; and storing in a digital data repository the input image having the assigned plurality of image labels.

5. The non-transitory computer storage medium of claim 4, wherein $y_l$ is +1 when the $l^{th}$ training image pair is a pair of similar training images and $y_l$ is −1 when the $l^{th}$ training image pair is a pair of dissimilar training images.

* * * * *